United States Patent [19]

Long

[11] Patent Number: 5,399,130
[45] Date of Patent: Mar. 21, 1995

[54] TRANSMISSION CONTROL WITH ELECTRONIC GOVERNOR AND TRIM BOOST

[75] Inventor: Charles F. Long, Pittsboro, Ind.

[73] Assignee: General Motors Corporation, Detroit, Mich.

[21] Appl. No.: 73,238

[22] Filed: Jun. 7, 1993

[51] Int. Cl.⁶ ............................................. F16H 61/00
[52] U.S. Cl. .................................. 477/130; 477/131; 477/906
[58] Field of Search ............... 477/130, 131, 132, 145, 477/146, 150, 151, 152, 906

[56] References Cited

U.S. PATENT DOCUMENTS

| | | |
|---|---|---|
| 4,308,764 | 1/1982 | Kawamoto et al. ............... 477/131 |
| 4,485,695 | 12/1984 | Kawamoto ......................... 477/130 |
| 5,033,331 | 7/1991 | Takada et al. ..................... 477/150 |
| 5,191,815 | 3/1993 | Kouta .................................. 477/906 |

*Primary Examiner*—Charles A. Marmor
*Assistant Examiner*—Troy Grabow
*Attorney, Agent, or Firm*—Donald F. Scherer

[57] ABSTRACT

A transmission control has a redundancy control for upshift and downshift control of friction torque transmitting devices in a power transmission. The control solenoid valves providing for continued governor and accumulator trim boost in the event of a malfunction, in either the electrical system or the hydraulic system, which affects the governor pressure schedule. A reverse control signal, from a manual valve, is effective to remove the malfunctioning solenoid valve from effective operation in the control.

3 Claims, 8 Drawing Sheets

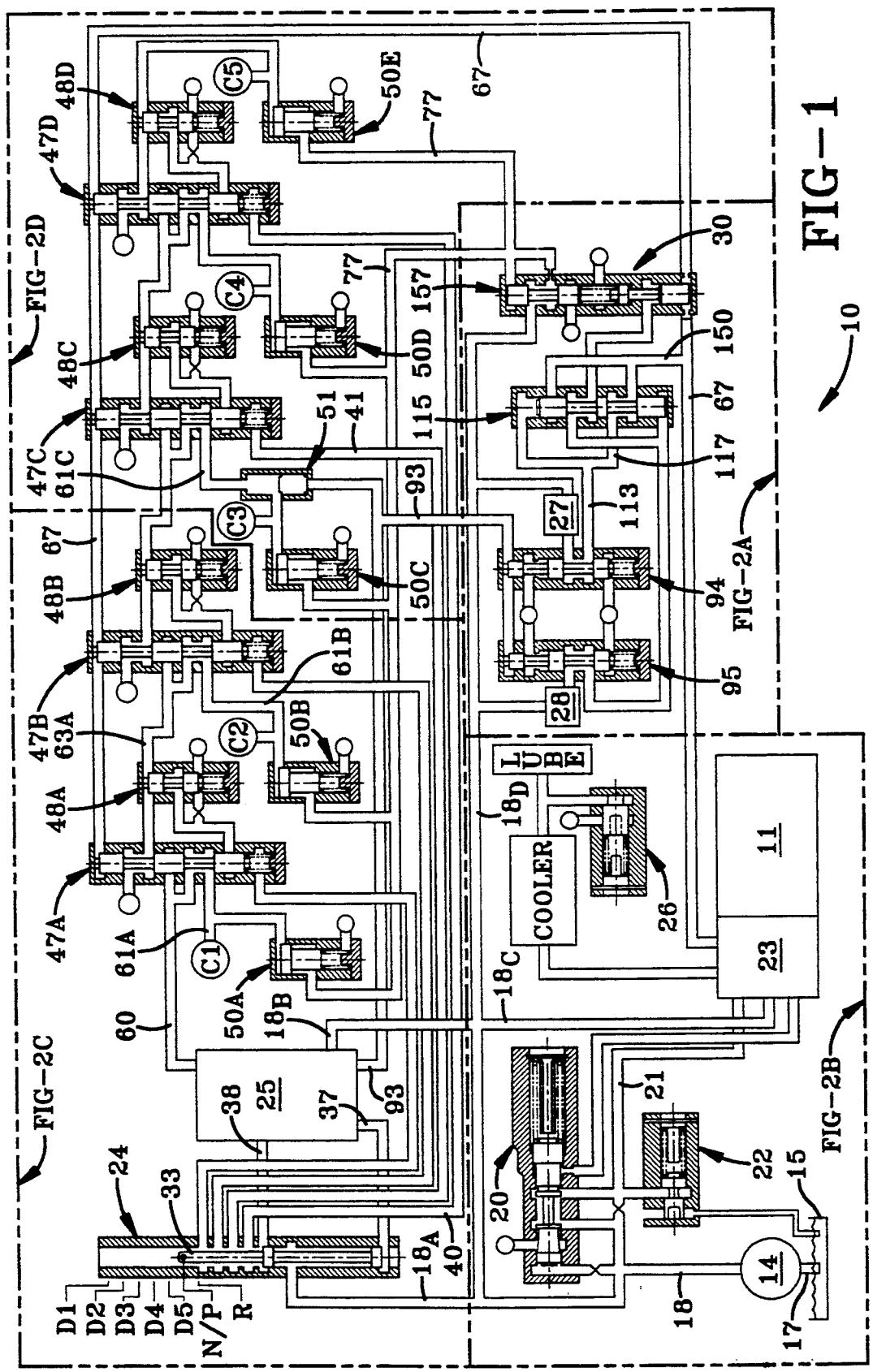

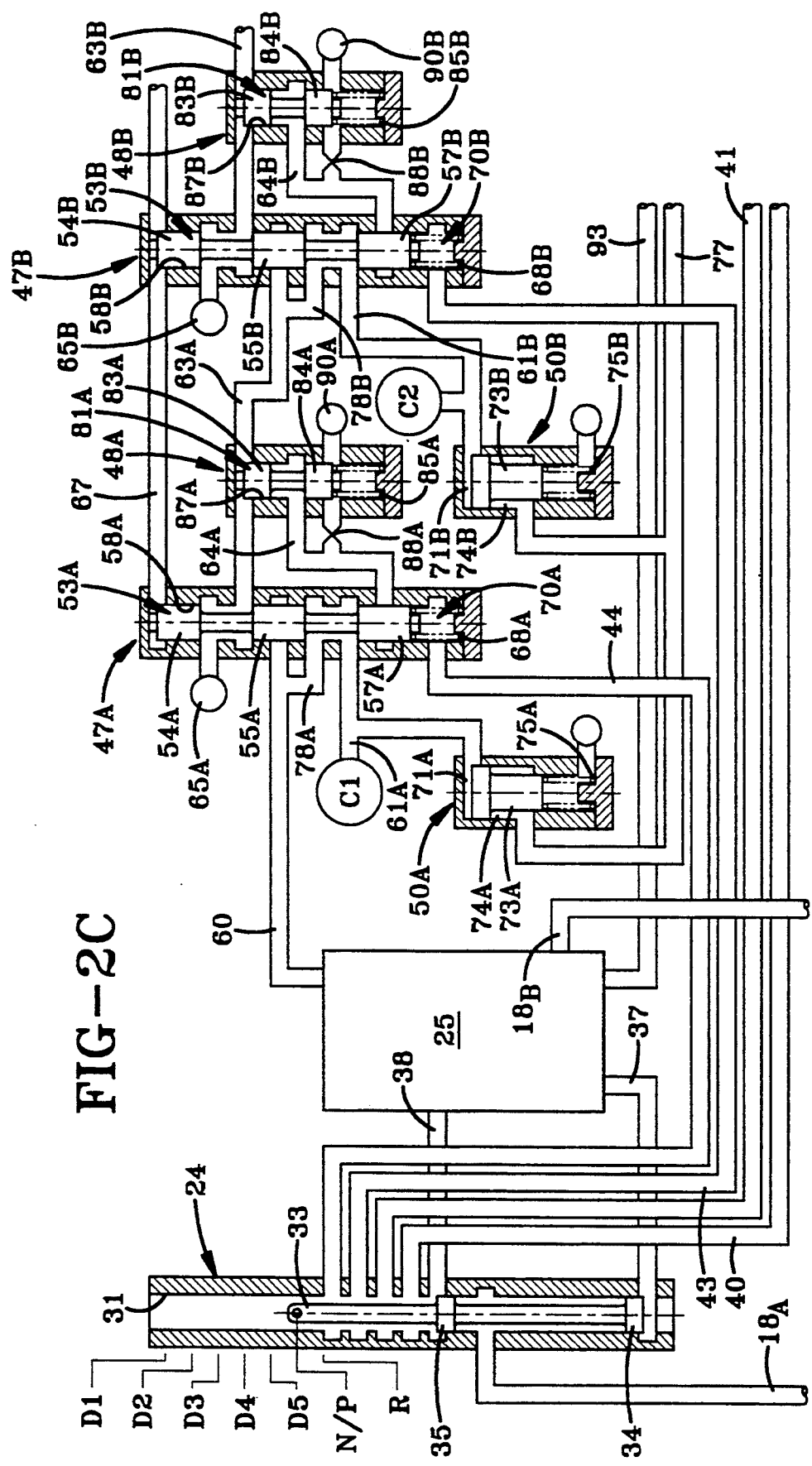

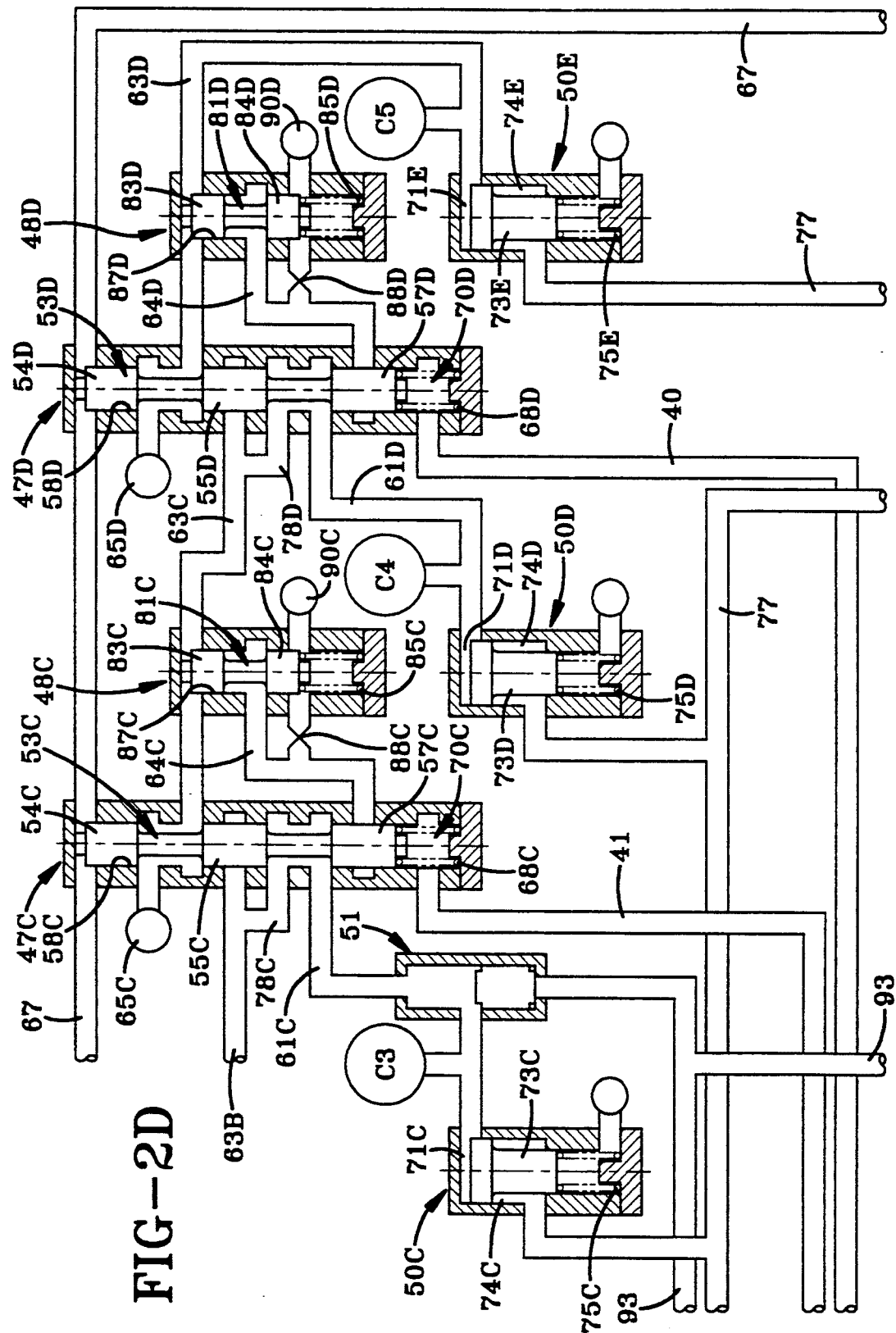

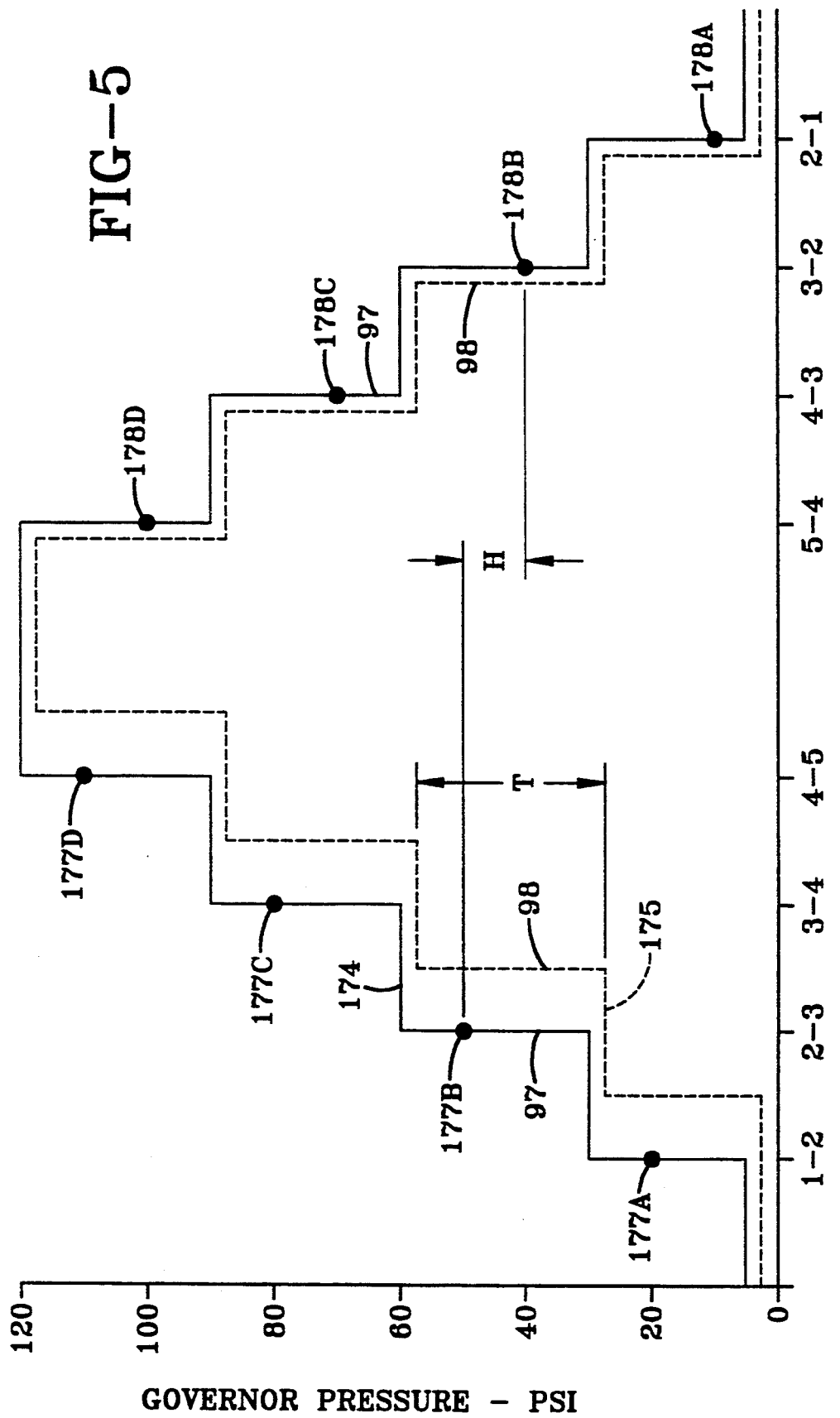

TRANSMISSION CONTROL WITH ELECTRONIC GOVERNOR AND TRIM BOOST

TECHNICAL FIELD

The present invention relates generally to transmission controls. More particularly, the present invention relates to transmission controls having electrical and hydraulic controls. Specifically, the present invention relates to transmission control valving wherein multiple accumulators have a trim pressure supplied by a single regulator valve and shift control signals that are continued in the event of a malfunction.

BACKGROUND OF THE INVENTION

Power-shifting automatic transmissions of both the planetary type and countershaft type use hydraulically actuated, friction torque devices to effect the selection of sequential drive ranges. Planetary type transmissions use friction torque transfer devices of both the clutch and brake variety. Countershaft type transmissions use friction torque transfer devices of only the clutch variety. The control mechanism which determines the shift sequence and timing for these transmissions can be either hydraulic control valving or the more recently introduced electro-hydraulic control valving. With electro-hydraulic controls, a pre-programmed digital computer is generally provided to determine both the shift schedules and pressure levels of the hydraulic actuating fluid within the transmission. The computer employs a look-up table which has the necessary data to determine the shift points in response to input signals from vehicle parameter detectors such as the vehicle and engine speed sensors, engine torque level sensors, throttle position sensors, and the like.

The computer analyzes the input signals and refers to the look-up table to determine the appropriate ratio interchange. The computer can also provide the necessary control signals to establish the output pressure of the solenoid valve. Generally the solenoid valves are either of the off-on type or the pulse width modulated (PWM) type. With either type, the output signal is delivered to either a valve, which will control the ratio interchange, or to the friction devices directly.

The control devices currently known have a governor and throttle signal to control the ratio interchange. In some instances this signal is combined by the electronics to provide a single electrical output signal which will determine the output pressure of the solenoid control valving. Should the solenoid have a malfunction, the transmission control includes a limp-home feature which causes the transmission to select a fixed gear ratio until proper repairs are undertaken. This feature prevents the driver from being stranded due to an electric or mechanical malfunction of the solenoids.

SUMMARY OF THE INVENTION

It is, therefore, a primary object of the present invention to provide an improved transmission control having full redundancy to permit continued full feature operation in the event of a solenoid or valve malfunction.

It is another object of the present invention to provide an improved transmission control, as above, wherein a driver alert to a single point malfunction is signalled by harsh shifts which result from increased trim boost pressure.

It is a further object of the present invention to provide an improved transmission control, as above, wherein an electronic governor and trim valve provide operation in a fifth range under some malfunction mode conditions in order to prevent transmission overspeed.

It is still another object of the present invention to provide an improved transmission control, as above, wherein conventional but harsh upshifting and downshifting continues even after the driver comes to a stop and selects reverse.

It is yet another object of the present invention to provide an improved transmission control, as above, wherein multiple accumulators are provided with trim pressures from a single regulator valve.

These and other objects of the invention, as well as the advantages thereof over existing and prior art forms, which will be apparent in view of the following detailed specification, are accomplished by means hereinafter described and claimed.

The present invention provides full range shifting in the forward ratios as well as in reverse operation in the event of a malfunction by one of the solenoid valves which control a particular ratio interchange in the transmission.

This control scheme assumes the existence of a cascading hydraulic control circuit that actuate the friction torque transfer devices in an automatic transmission. Also required are a manual selector valve, trimmer valves or accumulators and fluid operated friction torque transmitters. This invention consists of four hydraulic control valves referred to as:

1. a trim boost valve
2. a governor shuttle valve
3. an "A" solenoid interlock valve
4. a "B" solenoid interlock valve
5. two normally open (N/O) pressure regulating three-way solenoid valves.

The purpose of the governor shuttle valve is to direct the higher of the two solenoid pressures to the governor pressure passage and to the boost side of a plug valve on the trim boost valve. It also directs the lower of the two solenoid pressures to the other side of the plug on the trim boost valve. Trim boost pressure is maintained at a level determined by a spring which is set by the differential pressure between solenoids "A" and "B" which act on the plug through a pin and stop structure. During upshifts, the "B" solenoid is operated at a lower level than the "A" solenoid so that a differential pressure exists on the trim boost plug resulting in the desired trim boost pressure. Between upshifts, the "B" solenoid pressure rises to the same level as the "A" solenoid. The "A" solenoid continues to supply governor pressure. The interlock valve provides a control that will "lockout" a solenoid if a malfunction occurs that provides a pressure continuously greater than zero. The "lockout" is introduced when the transmission is shifted to reverse, thereby insuring that the vehicle speed is essentially zero to prevent any unscheduled downshifts. The control will permit the operator to resume normal operation although the upshifts will be harsh because of the high trim boost. This will remind the operator that some service is needed.

This hydraulic control scheme allows the control of shifts and trim boost pressure in any transmission control which utilizes cascaded relay valves and trimmers or accumulators for shift logic when controlling the ratio interchange in a transmission. The control provides full redundancy in the event of a solenoid valve malfunction. During normal operation, because of the delayed pressure rise in the "B" solenoid, a single regulator valve provides trim pressure bias for multiple accumulators To acquaint persons skilled in the arts most closely related to the present invention, one preferred embodiment of a governor control valving and a trim valve embodying the concepts of the present invention and adapted for use with a transmission control, and which illustrates a best mode now contemplated for putting the invention into practice is described herein by, and with reference to, the annexed drawings that form a part of the specification. The exemplary governor control is described in detail without attempting to show all of the various forms and modification in which the invention might be embodied. As such, the embodiment shown and described herein is illustrative, and as will become apparent to those skilled in these arts, can be modified in numerous ways within the spirit and scope of the invention; the invention being measured by the appended claims and not by the details of the specification.

BRIEF DESCRIPTION OF THE DRAWINGS

FIG. 1 is a diagrammatic representation of a transmission and control embodying the present invention;

FIG. 2C is also an enlarged portion of FIG. 1, the outline of which is delineated by the chain line identified as "FIG. 2C" and depicting a selector valve, a forward-reverse control assembly and two of the cascaded shift valves and their related accumulators;

FIG. 2D is also an enlarged portion of FIG. 1, the outline of which is delineated by the chain line identified as "FIG. 2D" and depicting the remaining two cascaded selector valves and their associated accumulators;

FIG. 5 is a graph representing typical pressure curves from the solenoid valves that control the ratio interchanges and trim pressure bias of the transmission control incorporating the present invention.

DESCRIPTION OF AN EXEMPLARY EMBODIMENT

Figure 2A:
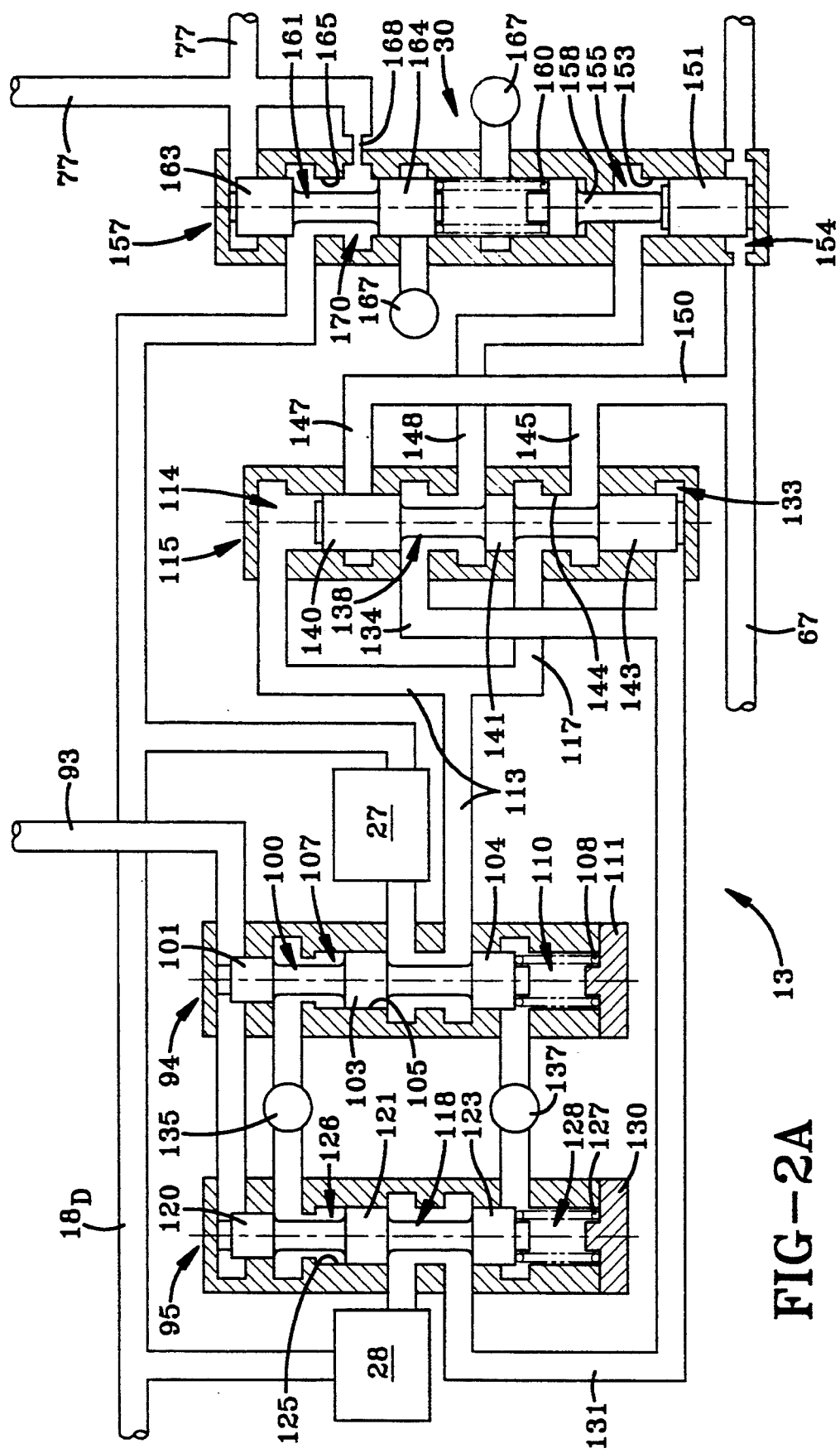
FIG. 2A is an enlarged portion of FIG. 1, the outline of which is delineated by the chain line identified as "FIG. 2A" and depicting a representative control valving arrangement incorporating the present invention.

The overall power transmission and control system embodying the concepts of the present invention is depicted diagrammatically, and designated by the numeral 10, in FIG. 1. The gearing portion of the transmission is represented at 11 and is preferably constructed in accordance with the teaching of U.S. Pat. No. 5,009,118 issued to Ordo et al on Apr. 23, 1991. However, other transmissions can also benefit from the present invention. Pressurized hydraulic fluid is provided to the control system 13 by a conventional, positive displacement pump 14 which draws hydraulic fluid from a reservoir 15 through a passage 17 for delivery to a main line conduit 18. A conventional pressure regulator 20 controls the fluid pressure in the main line conduit 18. The excess fluid—that is, fluid not needed for transmission control and clutch operation—delivered by the pump 14 is directed by an overage passage 21 to a conventional torque converter and clutch assembly 23. A conventional exhaust regulator valve 22 limits the fluid pressure at the torque converter and clutch assembly 23. The fluid flowing from the assembly 23 is directed through a cooler and a lubrication distribution system, so designated on FIGS. 1 and 2B of the drawings. The pressure in the lubrication system circuit is established by a conventional regulator valve 26.

The main line pressure conduit 18 is connected, by branch $18_A$ with a manual selector valve 24, by branch $18_B$ to a forward-reverse control assembly 25, by branch $18_C$ to the torque converter and clutch assembly 23, and by branch $18_D$ to a first and second normally open pulse width modulated (PWM) solenoid valves 27 and 28 and an accumulator trim boost control valve 30. The main line pressure distributed to the torque converter and clutch assembly 23 is utilized to engage the clutch in a well known manner. The manual selector valve 24 is adapted to be manipulated in a well known manner to distribute the pressurized hydraulic fluid in the main line pressure conduit 18 in accordance with the drive ratio selected by the operator. The selector valve 24 has a longitudinal bore 31 in which a spool valve member 33 is slidably disposed. The spool valve member 33 has spaced lands 34 and 35 which are adapted to selectively control the flow of main line, pressured hydraulic fluid from branch $18_A$ of the main line pressure conduit 18 to a reverse passage 37 when reverse drive "R" is selected by the operator and to a forward passage 38 when any forward drive "D1" through "D5" is selected by the operator.

When the operator desires to limit the number of forward drive ratios to less than the maximum number available (five with the depicted control), the manual selector valve 24 can be manipulated to the forward drive conditions "D4" through "D1". In the "D4" condition, main pressure is distributed to a "D4" passage 40 as well as the forward passage 38. All of the other passages leading from the selector valve 24 are exhausted. In the "D3" condition, main line pressure is distributed to a "D3" passage 41, as well as the "D4" passage 40 and the forward passage 38. In the "D2" condition, main line pressure is distributed to a "D2" passage 43 as well as the "D3" passage 41, the "D4" passage 40 and the forward passage 38. In the "D1" condition, main pressure is distributed to a "D1" passage 44 as well as the "D2" passage 43, the "D3" passage 41, the "D4" passage 40 and the forward passage 38. The effect of the pressure in passages 40, 41, 43 and 44 will be hereinafter discussed in greater detail.

The forward passage 38 and the reverse passage 37 as well as the main line pressure conduit 18 are distributed to a forward-reverse control assembly 25 which is effective to establish the power flow through the transmission in a well known manner. The above described in the aforesaid Ordo et al patent utilizes a synchronizer to establish the forward or reverse power path. The forward-reverse control assembly 25 is preferably constructed in accordance with the assembly described in U.S. patent application, Ser. No. 07/920,744, filed Jun.

1, 1992, in the name of Klemen et al and assigned to the assignee of this application.

The hydraulic control system 13 provides for controlling the engagement and disengagement of the friction torque transfer devices required to establish the ratios in the transmission 11. The ratio interchange control is provided by four shift valves 47A through 47D, four exhaust valves 48A through 48D and five accumulators 50A through 50E.

As previewed in the previous paragraph, and as will appear in the detailed description which follows, a particular structural member, component or arrangement may be employed at more than one location. When referring generally to that type of structural member, component or arrangement a common numerical designation shall be employed. However, when one of the structural members, components or arrangements so identified is to be individually identified it shall be referenced by virtue of a letter suffix employed in combination with the numerical designation employed for general identification of that structural member, component or arrangement. Thus, there are at least four shift valves which are generally identified by the numeral 47, but the specific, individual valves are, therefore, identified as 47A, 47B, 47C and 47D in the specification and on the drawings. This same suffix convention shall be employed throughout the specification for other components.

The transmission has five friction torque transfer devices in the nature of clutches designated "C1" through "C5". One of the clutches is engaged for each drive ratio while the remaining clutches are disengaged. The clutch "C3" provides both the third forward speed and the reverse speed. A two position shuttle valve 51 is operable to connect the proper passage to the "C3" clutch.

The shift valve 47A controls the one/two ratio interchange and employs a spool valve member 53A having spaced lands 54A, 55A and 57A that are slidably disposed in a bore 58A which communicates with a first clutch feed passage 60, a first clutch apply passage 61, a second clutch feed passage 63A, a first clutch exhaust passage 64A, the hydraulic fluid return line 65A, the "D1" passage 44 and a governor passage 67. The spool 53A is biased toward the governor passage 67 by a spring 68A, disposed in a chamber 70, that is located at one end of the bore 58A adjacent the land 57A. The passage 60 is connected with the forward-reverse control assembly 25 which is effective to distribute main line hydraulic pressure thereto when the forward passage 38 is pressurized.

In the spring set position shown,—that is, when the spool valve members are disposed solely in response to the biasing action of the spring—the valve 47A distributes main pressure in the clutch feed passage 60 between lands 55A and 57A to the first clutch apply passage 61 to effect engagement of the clutch "C1". The first clutch apply passage 61 is also connected with an accumulator chamber 71A which is a component of the accumulator 50A. The accumulator 50A also includes a plug 73A, a trim chamber 74A and a spring 75A. The accumulator 50A is effective to control the pressure rise in the clutch "C1" during engagement in a well known manner. The trim chamber 74A is pressurized by a controlled pressure in a trim passage 77, which has an effect on the pressure rise in the accumulator chamber 71A and therefore the engagement time of the clutch "C1" as represented by the pressure in first clutch apply passage 61.

In the pressure set position—that is, the position of the spool valve members when the pressure in the governor passage 67 overcomes the spring 68A—the passage 60 is connected between lands 54A and 55A to the second clutch feed passage 63A which is in fluid communication with the two/three shift valve 47B where it is closed by land 55B on spool valve member 55B. However, when the spool valve member 53B is in the spring set position depicted, an offset passage 78B connects the feed passage 63 and the space between lands 55B and 57B to a second clutch apply passage 61B which is effective, when pressurized, to enforce engagement of the second clutch "C2". The engagement time of the second clutch "C2" is affected by the accumulator 50B in the same manner as described previously herein with respect to the accumulator 50A.

The pressure in the second clutch feed passage 63 is also ported to react with a spool valve member 81A in the exhaust valve 48A. The spool valve member 81A includes a pair of spaced lands 83A and 84A. A spring 85A biases the spool valve member 81A to one end of a bore 87A in valve 48A. The first clutch exhaust passage 64A communicates with the bore 87A through a restriction 88A which is connected with an exhaust, or hydraulic fluid return line, 90A. When the shift valve 47A is initially moved to the pressure set position, the clutch "C1" will begin to exhaust through the restriction 88A. However, when the pressure in passage 63A is at a level sufficient to overcome the spring 85A, the spool valve 81A will connect passage 64A directly to the hydraulic return line exhaust passage 90A freely to exhaust the clutch "C1". The trigger pressure of the exhaust valve 48A is substantially equal to the minimum pressure required for the clutch "C2" to begin transmitting torque.

As the pressure in the governor passage 67 continues to increase, the shift valves 47C and 47D and will be shifted accordingly to control the second/third, third/fourth and fourth/fifth ratio interchanges, respectively. The upshifting occurs in accordance with the clutch interchange previously explained herein with respect to the first/second ratio interchange. The respective accumulators 50 and exhaust valves 48 will control the timing of the interchanges. It should be appreciated that the higher ratio clutches cannot be engaged until the next lower clutch has first been engaged. This is commonly termed a cascading pressure control. It should also be evident that the shuttle valve 51 (FIG. 2D) is effective to connect the passage 61C to the clutch "C3" and the trim chamber 74C in the accumulator 50C during a two/three ratio interchange. During downshifting when a clutch is engaged, the higher ranking clutches will be disengaged.

If the transmission 10 is in second gear—i.e. the valve 47A has upshifted, and the pressure in the governor passage 67 is reduced to a level sufficient to permit the spring 68A to reset (downshift) the shift valve 47A to the spring set position, the second clutch "C2" will be exhausted through the hydraulic fluid return line 65A while the clutch "C1" is engaged by pressure in passage 60 being communicated between lands 55A and 57A. Rapid disengagement of the off-going clutch, during downshifting, is generally preferred to permit the engine to freely accelerate to the speed required to accommodate the on-coming ratio.

The reverse ratio is engaged by the manual selector valve 24 being shifted to the reverse position to pressurize a reverse apply passage 93 which is fed through the forward-reverse control 25. When the passage 93 is pressurized, the shuttle valve 51 is moved to close the third clutch apply passage 61C from the shift valve 47C and simultaneously connect the reverse apply passage 93 with the clutch "C3" and the accumulator 50C. The reverse apply passage 93 is also connected with first and second interlock valves 94 and 95, respectively, which are in fluid communication with the respective solenoid valves 27 and 28 for a purpose that will be hereinafter described.

The solenoid valves 27 and 28 are of the modulating type such that each is capable of establishing a variable pressure output. The pressure output of the solenoid valves 27 and 28 will be termed a governor pressure. However, the pressure established by each valve 27 and 28 is affected by a number of vehicle parameters including vehicle speed and throttle setting or fuel feed. Other parameters may be provided, as desired. The signals controlling the PWM solenoid valves 27 and 28 are preferably established by a conventional pre-programmed digital computer which is incorporated in the transmission and control 10 and programmed in a conventional manner to establish the various pressures. Such computers and the operating or control algorithms are well known. The solenoid valve 27 is controlled at one pressure schedule while the solenoid valve 28 is controlled at another pressure schedule during upshifting. The difference in the schedules permits the solenoid valve 27 to operate along the line 97 of the curve shown in FIG. 5 and also permits the solenoid valve 28 to operate along the line 98 in that same figure. As seen in FIG. 5, the pressure output of solenoid valve 27 increases before the pressure output of the solenoid valve 28. The purpose for these different schedules will be explained in conjunction with the description of the valves 30, 94 and 95.

Figure 2B:
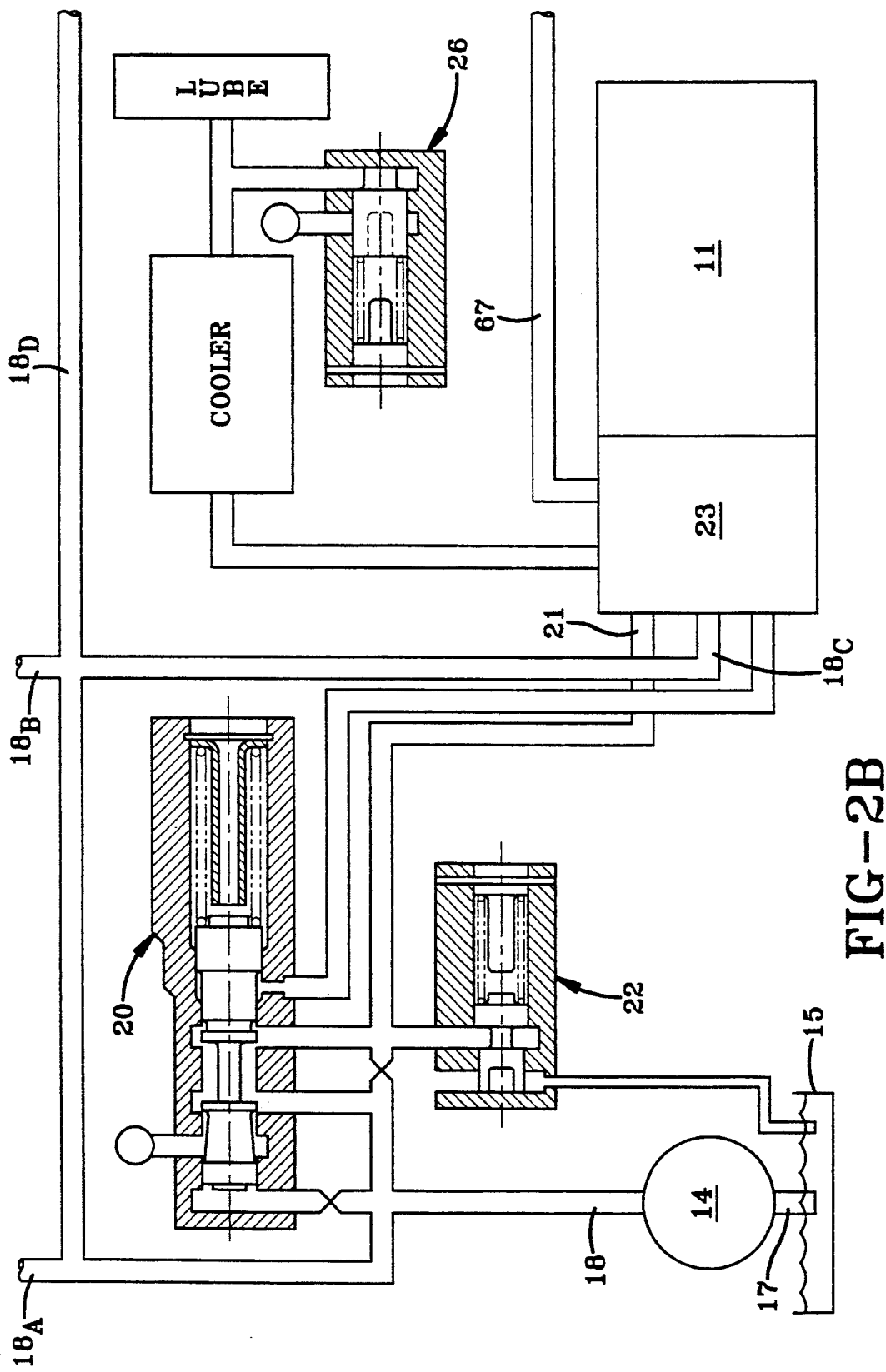
FIG. 2B is also an enlarged portion of FIG. 1, the outline of which is delineated by the chain line identified as "FIG. 2B" and depicting the source of hydraulic pressure, a pressure regulator assembly, a clutch assembly, the transmission gearing, a cooler and a lube system.

The first interlock valve 94 includes a spool valve member 100 having spaced lands 101, 103 and 104 slidably disposed in a stepped diameter bore 105. As best seen in FIG. 2A, the second and third lands 103 and 104 are of a larger diameter than the first land 101 and cooperate with the stepped diameter bore 105 to define an interlock chamber 107. The spool valve member 100 is urged toward one end of the bore 105 by a spring 108 disposed in chamber 110 and compressed between a plug 111 and the land 104. In the spring set position shown, the output pressure of solenoid valve 27 is in fluid communication with the bore 105 between the lands 103 and 104 to provide controlled fluid pressure to a control passage 113 which is in fluid communication with a control chamber 114 formed on a governor shuttle valve 115. A governor feed passage 117 branches from the passage 113 and is also connected with the shuttle valve 115 between lands 141 and 143 when the spool valve member 136 is disposed in the position best depicted in FIG. 2A.

The second interlock valve 95 includes a spool valve member 118 having spaced lands 120, 121 and 123 slidably disposed in a stepped diameter bore 125. As best seen in FIG. 2, the second and third lands 121 and 123 are of a larger diameter than the first land 120 and cooperate with the stepped diameter bore 125 to define an interlock chamber 126. The spool valve member 118 is urged toward one end of the bore 125 by a spring 127 disposed in a chamber 128 and compressed between a plug 130 and the land 123. In the spring set position shown, the output pressure of the solenoid valve 28 is in fluid communication with the bore 125 between the lands 121 and 123 to provide controlled fluid pressure to a control passage 131 which is in fluid communication with a control chamber 133 formed on the shuttle valve 115. A governor feed passage 134 branches from the passage 131 and is also connected with the shuttle valve 115.

The interlock valves 94 and 95 are both connected with the passage 93 which, as previously explained, is pressurized through the manual selecting valve 24 and the forward-reverse control 25 when the reverse drive is selected by the operator. The passage 93 communicates with the face of the lands 101 and 120 to impose a bias pressure thereon whenever the reverse drive is selected. In the spring set positions of both spool valve members 100 and 118 within the bores 105 and 125, the chambers 107 and 126 are in fluid communication with an exhaust, or hydraulic fluid return line, 135. The spring chambers 110 and 128 are also in fluid communication with an exhaust, or hydraulic fluid return line 137.

When the reverse passage 93 is pressurized, the spool valve members 100 and 118 will be moved to a pressure set position. In the pressure set position the exhaust passage 135 will be closed by the lands 101 and 120 from valves 94 and 95, respectively. Also in the pressure set position, the chambers 107 and 126 will be connected with the output pressure of respective solenoid valves 27 and 28 and the passages 113 and 131 will be connected with the exhaust passage 137. During normal operation, the solenoids 27 and 28 will not provide a pressure output during reverse operation.

The shuttle valve 115, included a spool valve member 138 having three lands 140, 141 and 143 which are slidably disposed in a bore 144 between the chambers 114, and 133. The bore 144 is disposed in fluid communication with the passages 117 and 134 as well as a pair of governor pressure passages 145 and 147, and a secondary trim boost passage 148. Both governor pressure passages 145 and 147 are connected with a primary boost passage 150 which, in turn, communicates with the primary governor passage 67. The spool valve member 138 in shuttle valve 115 is positioned by the pressure in the opposed chambers 114 and 133. It is evident from FIG. 5, that the pressure from solenoid valve 27 increases before the pressure from solenoid 28. Therefore, the shuttle valve 115, during normal forward operation, will be disposed in the position shown in FIGS. 1 and 2A. So disposed, the pressure from solenoid 27 is directed via passages 113, 117 and 145 to the governor passage 67 and the primary boost passage 150. The passage 147 is closed at the land 140 and the output pressure of the solenoid valve 28 is directed via passages 131 and 134 to the secondary boost passage 148.

The boost passage 148 is connected for fluid communication with one side of a boost plug 151, and boost passage 150, through governor passage 67 is connected for fluid communication with the opposite side of boost plug 151. The boost plug 151 is a component of the accumulator trim boost valve 30, as depicted in FIG. 2A. The plug 151 cooperates with a bore 153 to define a primary chamber 154, connected with governor passage 67 and thereby indirectly with primary boost passage 150. A secondary chamber 155 is connected in fluid communication with the secondary trim boost passage 148. The accumulator trim boost valve 30 also includes a regulator valve portion 157 which is connected with the plug 151 through a pin and stop 158, and a spring 160. The regulator valve portion 157 includes a valve spool member 161 having spaced lands 163 and 164 slidably disposed in a bore 165. The bore 165 is connected with the main line pressure conduit branch 18$_D$, the trim passage 77 and a pair of exhaust, or hydraulic fluid return lines 167. The trim passage 77 is connected to a control chamber 170 defined between the lands 163 and 164 through a restriction 168.

Fluid pressure in trim passage 77 will urge the spool member 161 against the spring 160 in a direction to close the main line pressure conduit branch 18$_D$ at land 163 and open the exhaust passage 167 previously closed by land 164. This action will control the pressure in the trim passage 77 in a well-known manner. Fluid pressure operating on the plug 151 will control the amount of compression in the spring 160 and therefore, the pressure level at which the regulator valve 157 maintains the pressure in trim passage 77. When the plug 151 is urged against the spring 160 by pressure in primary chamber 154, as determined by the solenoid valve 27, the pressure level in trim passage 77 will be at a high level, and when both chambers 154 and 155 are pressurized, the pressure level in trim passage 77 will be at a low level. The pressure level in trim passage 77 will provide a bias pressure for the trim chamber 74 in the accumulators 50 (through trim passage 77)—thereby providing a control pressure for the clutches "C1" through "C5" in a well-known manner.

Operation

Figure 3:
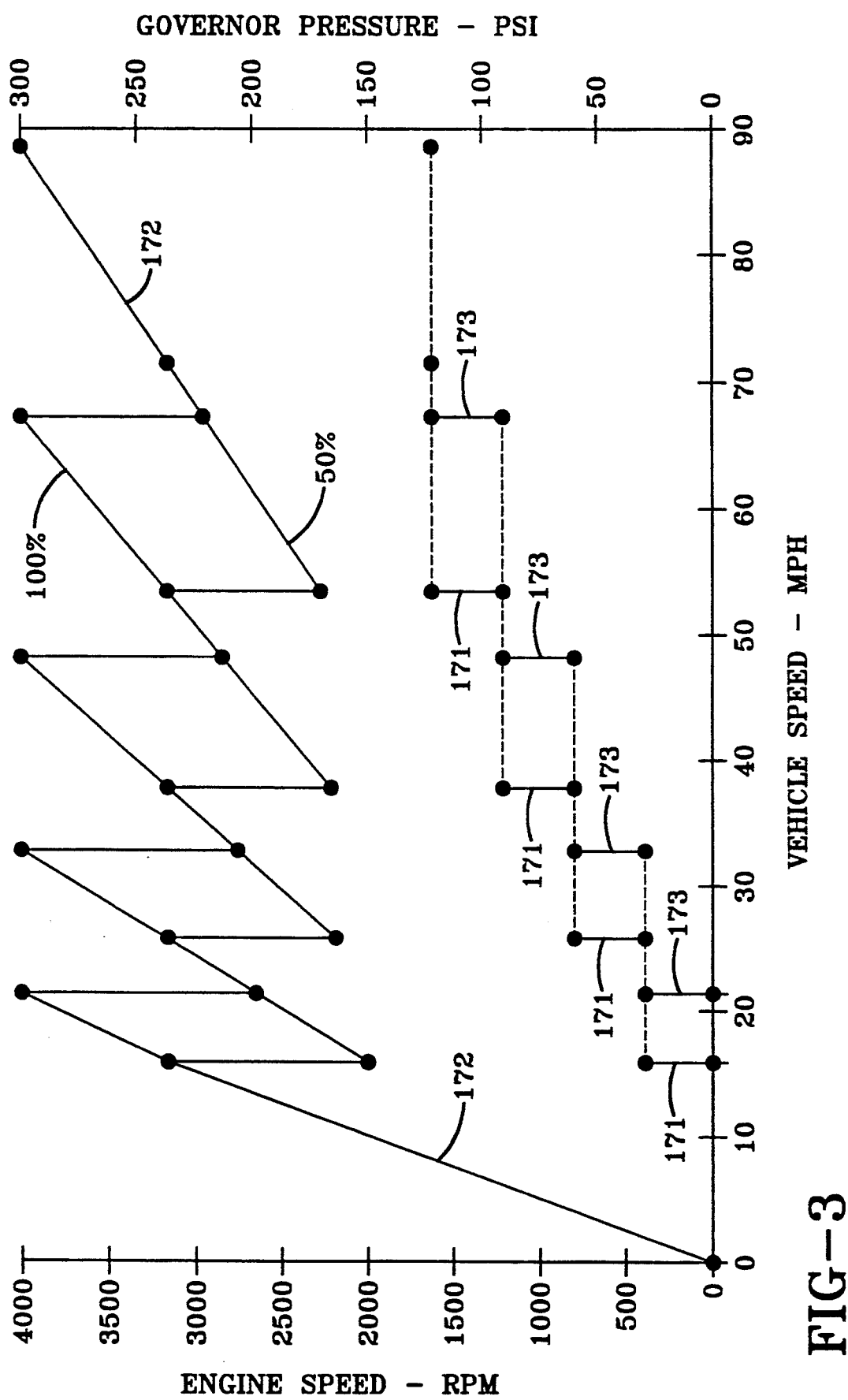
FIG. 3 is a graph representing operating parameter values present during upshifts in transmission control incorporating the present invention.
Figure 4:
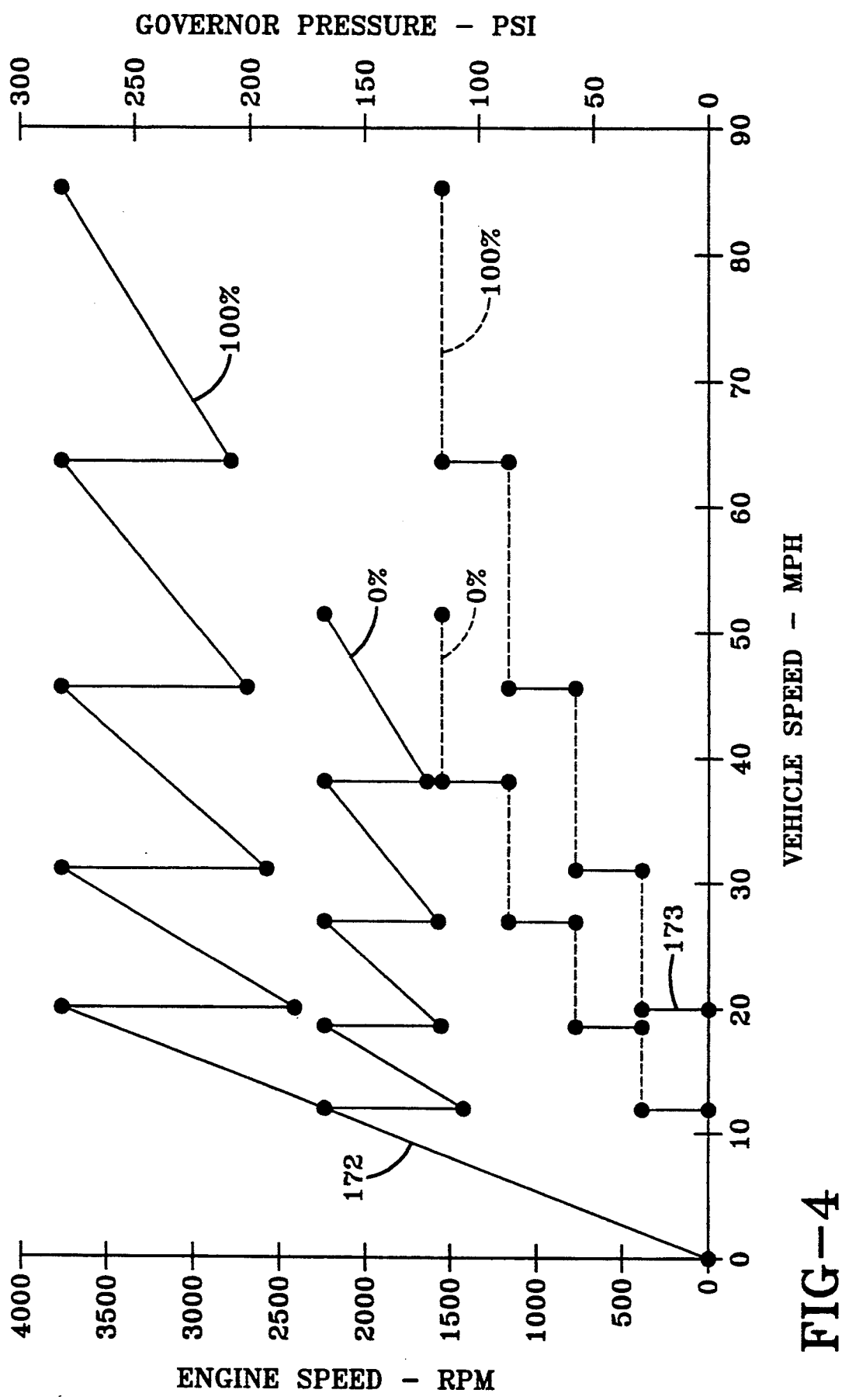
FIG. 4 is a graph representing operating parameter values present during downshifts in a transmission control incorporating the present invention.

With the vehicle engine operating, the pump 14, in conjunction with the regulator 50, provides pressurized hydraulic fluid. With the selector valve positioned for "D5", the vehicle will respond to a throttle increase by the operator to provide forward motion. The solenoid valve 27 will produce an output pressure in accordance with the curves shown in FIGS. 3 and 5. FIG. 3 depicts the pressure output of the solenoids 27 and 28 for fifty (50%) percent throttle by virtue of line 171 and for one-hundred (100%) percent throttle by line 173. FIG. 3 also depicts curves, or lines, which define the engine speed range for the ratios selected in the transmission. With reference to lines 172 in FIG. 3 the engine speed will decrease when an upshift occurs. To accomplish the engine decrease, the on-coming clutch—e.g.: clutch "C2" during a one/two shift, must absorb the engine inertia. To accommodate this, the clutch timing is controlled by the trim boost pressure reflected in the trim chamber 74 of the appropriate accumulator 50. The curves shown in FIG. 4 represent values similar to those in FIG. 3 during downshifts. The curves shown here, however, represent closed throttle and one-hundred (100%) percent throttle positions.

As best seen in FIG. 5, the solenoid valve 27 is controlled to provide a pressure increase, during upshifting, before the solenoid valve 28. This function is provided in a well-known manner by the digital computer which provides the control function of the vehicle in response to various input signals or data as previously described. When the pressure level of solenoid valve 27 increased, the governor shuttle valve 115 assumes the position shown in FIGS. 1 and 2. The governor shuttle valve 115 will not be shifted from this position, during forward operation, as long as the solenoid valves 27 and 28 do not malfunction. The output pressure of the valve 27 is directed to the governor passage 67, to act on the shift valves 47, and to the primary chamber 154 in the accumulator trim boost valve 30, to establish the output pressure level of the regulator valve portion 157 and the boost pressure at each accumulator 50, as communicated through trim passage 77. As seen in FIGS. 3 and 5, this creates a step function for the governor pressure while the accumulator trim boost pressure cycles between high and low values.

The pressure output level of the solenoid valve 28 lags that of valve 27, but achieves the same levels. The pressure output of the valve 28 is directed to the secondary boost chamber 155. When the pressure of valve 28 is equal to the pressure of valve 27, the trim boost pressure will be at a minimum as established by the biasing action of the spring 160 and the reduction in the projected area of the boost plug 151 resulting from the cross sectional area of pin 158. This permits the use of a single trim boost control valve 30 for all of the accumulators 50. Because the shift valves 47A through 47D are cascaded, the trim boost pressure on the respective accumulators 50A through 50D is effective only during the shift sequence controlled by the upshifting valve. To eliminate the pin 158 from the trim boost pressure determination, equal diameter pin extensions can be incorporated on both sides of the plug 151 with one pin end passing into the valve bore 165 and the other pin end disposed in a bore in the bottom of chamber 154 and being connected to exhaust.

As the vehicle speed increases, the pressure in passage 67 will increase in accordance with the schedule depicted in FIG. 3. At a predetermined speed, depending on throttle position, the output pressure of valve 27 will be increased to effect upshifting of the shift valve 47A—thereby causing the clutch "C2" to be pressurized and the clutch "C1" to be exhausted through the valve 48A to return line 90A. The plug 151 is forced against the spring 160 to established an appropriate pressure, depending on vehicle parameters, within the chamber 74B of the accumulator 50B to control the pressure rise schedule of the clutch "C2". The remaining chambers 74 will also be pressurized but the accumulators 50 connected therewith are inoperative at that stage. The pressure output of the valve 28 will then be increased to cause the plug 151 to be pressure balanced and the output pressure of the regulator valve portion 157 to reduce to the minimum value.

A further increase in the vehicle speed, at a constant throttle setting, will result in increased pressure in the passage 67 at the desired shift speed as shown by the curves in FIGS. 3 and 5. At a predetermined pressure, the shift valve 47B will be upshifted and the trim boost pressure in the passage 77 will be increased such that the accumulator 50C will be effective to control the engagement pressure schedule at the clutch "C3" while the clutch "C2" is exhausted through the valve 48B to the return line 90B. FIG. 5 shows the output pressure of solenoid valve 27 at line portion 174, is at a pressure level greater than the output pressure of solenoid valve 28 at the line portion 175. This establishes the trim boost pressure in passage 77 that is available in the chamber 74C during the two/three ratio interchange. When the shift is completed and the output pressure of solenoid valve 28 is increased to a level equal to the outlet pressure of solenoid valve 27, the trim boost pressure in passage 77 will decrease to a minimum value as determined by the spring 160.

As the vehicle speed continues to increase, the valve 47C will reach the shift point to control the three/four ratio interchange through the engagement of clutch "C4", as controlled by the accumulator 50D, while the valve 48C controls the disengagement of the clutch "C3". The trim boost pressure will be controlled in the manner previously described. The four/five ratio interchange, resulting from an upshift at the valve 47D, represented by the engagement of the clutch "C5", as controlled by the accumulator 50E, and the disengagement of the clutch "C4" will occur in the manner as described above for the other ratio interchanges.

It should be apparent that the valve 30 is effective to control the trim pressure at each upshift ratio interchange. The combination of the plug 151 and the solenoid valves 27 and 28 assist the valve 30 in providing this feature. Closed throttle downshift ratio interchanges are made without trim boost inasmuch as engine torque is minimal during this event. The curves of FIG. 5 also show the hysteresis "H" between the upshift and the downshift schedule. For example, the one/two upshift begins at the point 177A on curve 97 while the two/one downshift begins at the point 178A on curve 97. Likewise, the two/three upshift occurs at the point 177B while the three/two downshift occurs at the point 178B. The other upshift and downshift points are evident on the curve 97.

The difference between the upshift and downshift points represents the hysteresis. This function (hysteresis) is provided to prevent "hunting" by the transmission control when the vehicle is operated close to any shift point. While the hysteresis function can be provided in many ways, the most common is to provide a differential area on the shift valve which is subjected to the on-coming clutch pressure after the shift. With this structure, the forces holding the valve in the upshifted position are greater after the shift such that the control pressure in passage 67 must be at a lower level when a downshift occurs.

The upshift schedules at fifty percent and one-hundred percent throttle, represented by governor pressure schedules and engine speed curves, are shown in FIG. 3. As will be apparent from reviewing the curves shown, the engine speed is higher during the ratio interchange and the interchanges occur at higher engine speeds as the throttle setting is increased. The downshift schedules of zero percent and one-hundred percent throttle, represented by governor pressure schedules and engine speed curve, are shown in FIG. 4. As is apparent from the curves, the downshift vehicle speed increases as the throttle position is increased. These are conventional shift schedules.

The transmission can be limited to less than all of the forward speed ratios by manipulation of the manual valve. For example, if the operator does not wish the transmission to reach the fifth forward speed ratio, the manual valve will be moved to the "D4" position. In this position, the "D4" passage 40 will be pressurized. The pressure in this passage 40 is directed to the chamber 70D of the valve 47D. This pressure acts on the land 57D to assist the spring 85D in resisting the upshifting of the valve 47D. The pressure in the passage 67 will not be sufficient to force the upshifting of the valve 47D.

Manipulation of the manual valve to the other forward ratio positions represented by "D3" through "D1" will result in limiting the upshifting of the transmission to the third forward through first forward ratios respectively. In "D3", the passage 41 and therefore chamber 70C will be pressurized to prevent the upshifting of the valve 47C such that the transmission control cannot energize the clutches "C4" and "C5". Likewise, the pressurization of the passages 43 and 41 respectively to prevent the shifting of valves 47B and 47A, respectively. The operator can control the upshifting to some extent by starting in "D1" and upshifting to successive gears as desired. The upshift will occur if the other parameters are satisfied, that is the pressure in passage 67 is sufficient to shift the respective valves. The operator can downshift from any forward to a lower forward ratio through the manipulation of the manual valve 24.

The purpose of the shuttle valve 115 is to direct the higher pressure output of the two solenoid valves 27 and 28 to the lower end of the plug 151 and to the governor passage 67. When the control system is operating as intended, the solenoid valve 27 will, at a predetermined portion of the cycle, provide a higher pressure than the solenoid 28 during the upshift cycle. However, if the solenoid valve 28 should inadvertently produce a higher pressure than the solenoid valve 27, the chamber 133 will be at a higher pressure resulting in the shuttle valve 115 being forced into the chamber 114. In this position, the passage 131 is connected to the passage 147 between lands 140 and 141 and the passage 117 is connected with the passage 148 between the lands 141 and 143. Thus, it should be evident that the output pressures of the solenoid valves 27 and 28 and their function is then reversed.

If either solenoid valve 27 or 28 should malfunction and provide a constant output pressure other than zero, the normal shift sequences will be interrupted. The operator can eliminate this situation by bringing the vehicle to a stop and shifting to reverse. When the reverse ratio is selected, the passage 93 is pressurized. This results in the shuttle valve 91 being moved to direct the fluid pressure in passage 93 to the clutch "C3". Also during a shift to reverse, the forward-reverse control 25 will condition the necessary mechanism (i.e.: a synchronizer) to the proper position.

The pressure in passage 93 will also act on the lands 120 and 101 to shift the spool valve members 118 and 100 against the respective springs 127 and 108. When the spool valve members 118 and 100 are shifted, the chambers 126 and 107 are connected with the output pressures from the solenoid valves 28 and 27, respectively. If one of these solenoid valves has malfunctioned in a high output pressure condition, the respective interlock valve 94 or 95 will remain in the shifted position because of the pressure bias in the respective chamber 107 or 126. When the operator shifts to a forward drive condition, only one solenoid valve pressure output will be available to the governor passage 67 and boost passage 150. This will result in maximum trim boost pressure at the accumulators 50 such that the operator will experience harsh shifting at all throttle conditions. This shift feel will continually remind the operator that some repair is required. However the operator will have the entire range of operation until the repairs are effected.

Also with this control, if either solenoid malfunctions to maintain a low output pressure, the operator will also feel harsh shifts but a shift from forward to reverse is not required to clear the system. If the shuttle valve 51 should become stuck in either extreme condition, the transmission will undergo harsh shifting, again alerting the operator to the need for repair. If the shuttle valve 51 malfunctions in the center position, all the transmission shifts will be soft, suggesting slipping clutches, which will alert the operator to the need for repair. Malfunctions in the valve 30 will result in harsh shifting when continual high trim boost pressure is present and in soft shifting if continual low trim boost pressure is present. As explained above, these conditions alert the operator to the need for repair.

The foregoing description of the exemplary embodiment of the invention has been presented for the purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A transmission shift signal control comprising:
   regulator valve means for providing a trim pressure fluid for a plurality of accumulators including a boost plug;
   shuttle valve means for selectively directing pressurized fluid to first and second ends of the boost plug and for directing pressurized fluid to a governor passage;
   first interlock valve means for selectively directing pressurized fluid from a first solenoid valve means to said shuttle valve means to be thereby directed to the first end of the boost plug and said governor passage;
   second interlock valve means for selectively directing pressurized fluid from a second solenoid valve means to said shuttle valve means to be thereby directed to the second end of the boost plug when the pressurized fluid from said first solenoid valve means is at a level greater than the pressurized fluid from said second solenoid valve means; and,
   said boost plug being responsive to the fluid from the first and second interlock valve means to switch the fluid from the second interlock valve means to the first end of the boost plug when the pressure level of the fluid directed from the second interlock is greater than the fluid directed from the first interlock.

2. A transmission shift signal control comprising:
   manual valve means for directing fluid to establish forward and reverse drive ratios;
   regulator valve means for providing a trim pressure fluid for a plurality of accumulators including a boost plug;
   shuttle valve means for selectively directing pressurized fluid to first and second ends of the boost plug and for directing pressurized fluid to a governor passage;
   first interlock valve means for selectively directing pressurized fluid from a first solenoid valve means to said shuttle valve means to be thereby directed to the first end of the boost plug and said governor passage and including first interlock chamber means;
   second interlock valve means for selectively directing pressurized fluid from a second solenoid valve means to said shuttle valve means to be thereby directed to the second end of the boost plug when the pressurized fluid from said first solenoid valve means is at a level greater than the pressurized fluid from said second solenoid valve means and including second interlock chamber means; and,
   said boost plug being responsive to the fluid from the first and second interlock valve means to switch the fluid from the second interlock valve means to the first end of the boost plug when the pressure level of the fluid directed from the second interlock is greater than the fluid directed from the first interlock, both said first and second interlock chamber means being connected with the fluid from said first and second solenoid valve means respectively when the reverse drive ratio is selected by the manual valve means.

3. A transmission control comprising:
   a source of fluid pressure including a pump means and a system regulator valve;
   a plurality of fluid operated selectively engageable torque transmitting means for establishing a plurality of speed ratios in a transmission, respective ones of said torque transmitting means being interchanged during a change of ratios;
   a plurality of shift valve means for controlling the interchange of ratios each including accumulator means for assisting in controlling interchange time, each accumulator means having a trim chamber means for providing a reaction pressure during said interchanges;
   trim boost supply means for supplying and controlling a trim boost pressure delivered to the trim chamber means including pressure regulator means for supplying pressurized fluid and boost plug means having a first chamber means for increasing the fluid pressure at the pressure regulator means and a second chamber means for counteracting the first chamber means; and,
   solenoid valve means in combination with a pair of interlock valve means and a shuttle valve means for selectively supplying and directing pressure to the first chamber means when each ratio interchange is initiated and to the second chamber means prior to the occurrence of a subsequent ratio interchange.

* * * * *